(12) United States Patent
Yamada et al.

(10) Patent No.: US 7,021,842 B2
(45) Date of Patent: Apr. 4, 2006

(54) OPTICAL FIBER ARRAY

(75) Inventors: Eiichiro Yamada, Kanagawa (JP);
Kazuhito Saito, Kanagawa (JP);
Mitsuaki Tamura, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 133 days.

(21) Appl. No.: 10/222,795

(22) Filed: Aug. 19, 2002

(65) Prior Publication Data
US 2003/0152343 A1 Aug. 14, 2003

(30) Foreign Application Priority Data
Feb. 14, 2002 (JP) .................................... 2002-036753

(51) Int. Cl.
*G02B 6/255* (2006.01)
*G02B 6/00* (2006.01)

(52) U.S. Cl. .............................. 385/99; 385/28; 385/95; 385/136; 385/137

(58) Field of Classification Search ............ 385/95–99, 385/28, 129, 136–137, 43, 52, 138, 114
See application file for complete search history.

(56) References Cited

U.S. PATENT DOCUMENTS

| 4,900,118 | A | * | 2/1990 | Yanagawa et al. ............. 385/24 |
| 5,764,833 | A | * | 6/1998 | Kakii et al. .................... 385/54 |
| 6,345,916 | B1 | * | 2/2002 | Yui et al. ....................... 385/80 |
| 6,377,743 | B1 | * | 4/2002 | Ueda et al. ................... 385/137 |

FOREIGN PATENT DOCUMENTS

| DE | 3617799 A1 | * | 12/1987 |
| EP | 0 624 808 A1 | | 11/1994 |
| EP | 0 859 253 A1 | | 8/1998 |
| EP | 0 943 941 A1 | | 9/1999 |
| JP | 3130705 | * | 6/1991 |
| JP | 04-130304 A | | 5/1992 |
| JP | 08-110441 | | 4/1996 |
| JP | 2618500 | | 3/1997 |
| JP | 11-084164 | | 3/1999 |
| JP | 2000-275470 | | 10/2000 |
| JP | 2002-40290 A | | 2/2002 |

* cited by examiner

*Primary Examiner*—Edward J. Glick
*Assistant Examiner*—Krystyna Suchecki
(74) *Attorney, Agent, or Firm*—McDermott Will & Emery LLP

(57) ABSTRACT

In an optical fiber array, an optical fiber, a bundle of optical fibers or an optical fiber ribbon is mounted on an array substrate with a V-groove or V-grooves. A bare fiber portion in which a fiber coating is removed is placed in the V-groove, pressed by a presser member 6 and bonded by adhesives. At the front end, the fiber(s) is/are accurately positioned to connect to optical components or PLCs. The bare fiber portion contains a spliced portion of the dissimilar optical fibers having different mode field diameters and a mode field converting portion. The spliced portion of the dissimilar optical fibers is mounted on the array substrate. A flexible protection member is provided in the fiber coating portion extending over a rear edge of the array substrate. The optical fiber is bonded onto the array substrate, employing three kinds of adhesives that are different in the Young's modulus after hardening and the viscosity before hardening.

19 Claims, 4 Drawing Sheets

OPTICAL FIBER ARRAY

BACKGROUND OF THE INVENTION

1. Field of the Invention

The present invention relates to an optical fiber array in which an optical fiber, a bundle of optical fibers or an optical fiber ribbon is attached and fixed on an array substrate and which is useful for connecting an optical fiber or an optical fiber ribbon to optical components or a planar light wave circuit (PLC).

2. Description of the Related Art

In an optical fiber communication system, an optical fiber array is employed to connect an optical fiber to optical components or PLC. The optical fiber array usually comprises an array substrate provided with V-grooves, each V-groove being for positioning an end portion of an optical fiber, and a lid for pressing the end portion of the optical fiber in the V-groove. The optical fiber includes an optical fiber and an optical fiber ribbon in which a plurality of optical fibers are integrally bundled with a tape or resin. The optical fiber array is manufactured by positioning the end portion of the optical fiber in the V-groove, pressing the end portion of the optical fiber in the V-groove with the lid, bonding the optical fiber on the array substrate, using the adhesives, and then polishing the front end portion of the array substrate where an end face of the optical fiber is exposed.

In recent years, an optical fiber is required to connect to a PLC (PLCs) having a mode field diameter (a smaller mode field diameter than ITU-T standard size) different from a standard single mode optical fiber. In this case, an optical fiber having a small mode field diameter is employed for connection with the PLC, and an optical fiber having a standard mode field diameter is employed for connection with a cable side. In the optical fiber array for use to make connection with the PLC, the optical fiber having the smaller mode field diameter is fusion spliced at a top end of the optical fiber having the standard mode field diameter, causing a large splice loss.

In splicing a non-standard optical fiber and the standard single mode optical fiber which have different mode field diameters, it is difficult to obtain a practical splice loss only by normal fusion splicing technique. Conventionally, a method is known in which optical fibers are fusion spliced and then a spliced portion of the optical fibers is additionally heated (Thermally Expanded Core, hereinafter referred to as TEC or TEC process) to reduce the splice loss (e.g., refer to JP2618500 and JP-A-2000-275470). With such an additional heating, a dopant added to the core portion of the optical fiber is thermally diffused to the cladding portion of the optical fiber to cause an expand of the mode field diameter locally. Thus, the mode field diameters of the optical fibers at the spliced portion are coincident with each other.

SUMMARY OF THE INVENTION

It is an object of the invention to provide an optical fiber array that can be miniaturized in the size, can prevent an optical fiber from being broken when it is bent or a tensile load is applied to it, and can prevent an increase in the transmission loss due to a temperature change.

According to the present invention, there is provided an optical fiber array comprising: an optical fiber/optical fibers formed by splicing dissimilar optical fibers having different mode field diameters, each the optical fiber having a fiber coating portion which a fiber coating is applied and a bare fiber portion which the fiber coating is removed, the bare fiber portion having a spliced portion of the dissimilar optical fibers; an array substrate for mounting the optical fiber(s) thereon, the array substrate having a fiber aligning portion and a base portion, the fiber aligning portion having a V-groove/V-grooves for positioning each the bare fiber portion of the optical fiber(s); a presser member for pressing the bare fiber portion to the V-groove(s) of the array substrate; and a first adhesive for fixing the bare fiber portion to the V-groove of the array substrate, wherein the spliced portion of the dissimilar optical fibers is disposed on the array substrate. Preferably, a flexible protection member is provided in the fiber coating portion extending over a rear edge of the array substrate. Furthermore, the optical fiber may be bonded onto the array substrate, employing three kinds of adhesives that are different both in the Young's modulus after hardening and the viscosity before hardening.

FIG. 6 is a view showing an example for splicing the PLC and the standard single mode optical fiber that have different mode field diameters, using an optical fiber array combining a TEC fiber technology and an optical fiber array technology together. In FIG. 6, reference numerals 1, 1a and 1b denote optical fibers, 2 denotes a fiber coating portion, 3 denotes a bare fiber portion, 4 denotes an optical fiber array, 5 denotes an array substrate, 6 denotes a presser member, 7 denotes a V-groove, 8 and 9 denote adhesives, 10 denotes a spliced portion, and 16 denotes a reinforcing member.

An optical fiber 1 has an optical fiber 1b having a smaller mode field diameter and an optical fiber 1a (standard single mode optical fiber) having a larger mode field diameter. The optical fiber 1b is fusion spliced at a top end of the optical fiber 1a. A spliced portion 10 of the optical fibers 1a, 1b is protected by a reinforcing member 16. In order to reduce the splice loss, the spliced portion 10 is subjected to the TEC process involving additional heating after fusion splicing. The optical fiber 1b is bonded onto the array substrate 5 using adhesives. The spliced portion 10 is protected by there in forcing member 16 and disposed outside the optical fiber array 4.

The reinforcing member 16 of the spliced portion 10 that is fusion spliced requires a dimension as large as the external shape of optical components, and a relatively large space for leading the optical fiber. Therefore, there is a problem that the optical communication unit is difficult to be miniaturized, and is not easy to handle, owing to the reinforcing member 16.

The optical fiber array 4 includes the array substrate 5 and the presser member 6. The array substrate 5 includes a fiber aligning portion 5a with the V-groove 7 at a front portion thereof and a base portion 5b at a rear portion thereof. After the adhesive 8 is applied into the V-groove 7 of the fiber aligning portion 5a, at the front end portion of the bare fiber portion 3, in which the fiber coating is removed, the optical fiber 1b is inserted into the V-groove 7, pressed in position by the presser member 6, and bonded by the adhesive 8.

A part of the adhesive 8 within the V-groove flows out onto the base portion 5b and covers a rear end portion of the bare fiber portion 3 projecting from a rear end of the V-groove. Further, a part of the adhesive 8 flows between the fiber coating portion 2 and the base portion 5b to bond a rear end portion of the bare fiber portion 3 and a front end portion of the fiber coating portion 2 on the base portion 5b. Furthermore, to restrict the optical fiber 1b from moving freely at a rear end of the optical fiber array, the fiber coating portion 2 is bonded onto a rear end portion of the base portion 5b, using an adhesive 9 softer than the adhesive 8.

With the above constitution of the optical fiber array, the optical fiber 1 is in contact with a rear edge 5c of the array substrate 5. Therefore, the optical fiber 1 may cause a disconnection by being bent at the rear edge 5c of the array substrate 5, or produce an increase in the splice loss due to a temperature change. To avoid these problems, the rear edge 5c of the array substrate 5 is processed to have a tapered surface.

However, since the array substrate 5 is formed of various sorts of wafers such as silicon, Pyrex, zirconia or ceramics, the tapered surface is formed by precise grinding such as dicing. In this grinding, a special-purpose precise blade is used and the high working precision is required. A method for forming the tapered surface by grinding the rear edge 5c is known, but takes a considerable amount of working time and a labor. Besides, a method for forming the tapered surface by molding is considered but has a problem that the molding is difficult depending on the array substrate material.

It is also known that if a hard adhesive resin having a relatively large Young's modulus is employed as the adhesive 8 coating the entire bare fiber portion 3 in bonding the optical fiber 1, there is an increase in transmission loss of the optical fiber at low temperatures. As its cause, it is considered that the adhesive resin shrinks at low temperatures, so that the optical fiber is pulled at the upper surface of the array substrate by the thermal shrinkage of the adhesive resin. Further, the adhesive 9 applied on the fiber coating portion 2 is an adhesive resin softer than the adhesive 8. Since the adhesive 8 is scarcely applied on a portion of the fiber coating portion 2, a tensile load is applied to the bare fiber portion 3 in which the fiber coating is removed. Thus, the bare fiber portion 3 is considered to be weak to the tensile load. As a result, the optical fiber 1 is likely to be broken in the bare fiber portion 3 when the tensile load is applied to the optical fiber 1 in a longitudinal direction or the fiber is bent sharply at the rear side.

Also, if a soft adhesive resin having a relatively small Young's modulus is employed as the adhesive 8 coating the entire bare fiber portion 3, the optical fiber is weak as a whole to resist the tensile load, even if the adhesive 9 is applied on the fiber coating portion. That is, in the constitution of bonding the optical fiber 1 onto the optical fiber array 4 by one or two kinds of adhesive resins, as shown in FIG. 6, it is difficult to prevent an increase in the transmission loss due to a temperature change and to meet the requirements under a certain tensile load.

DETAILED DESCRIPTION OF THE INVENTION

Figure 1:
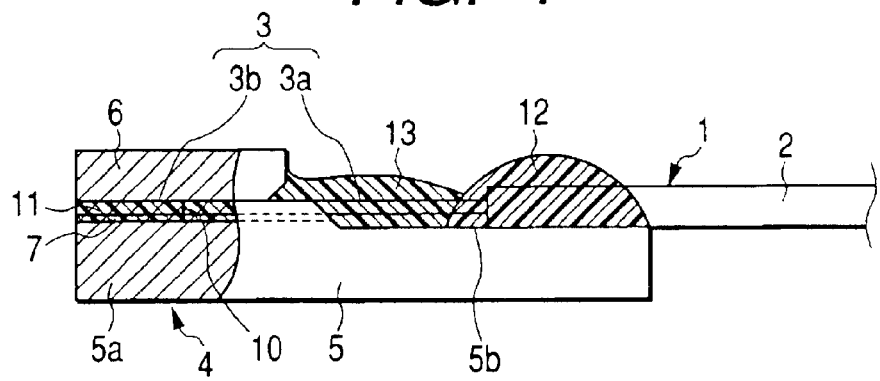
FIG. 1 is a view for explaining an optical fiber array according to an embodiment of the present invention.
Figure 2A:
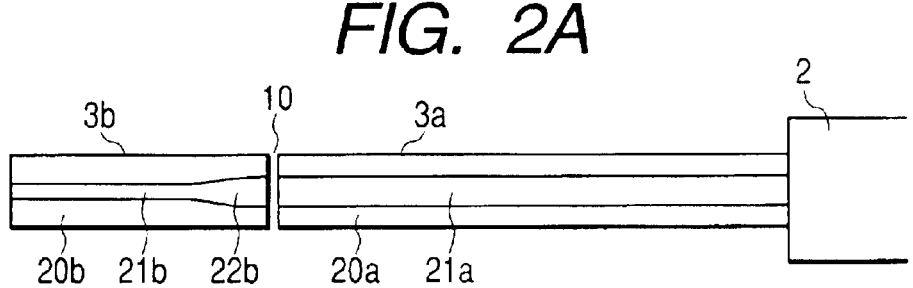
FIGS. 2A-2C are views for explaining forms of splicing optical fibers having different mode field diameters for use in the invention.
Figure 2B:
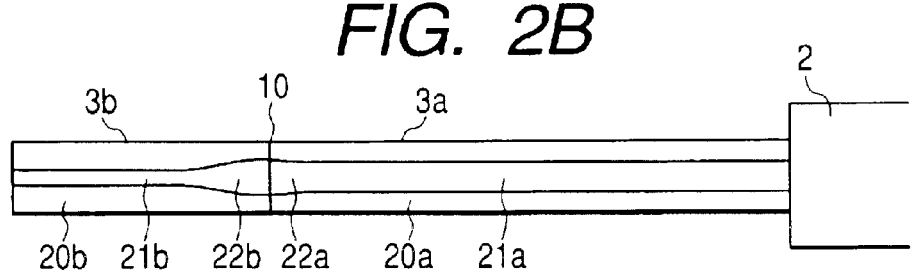
Figure 2C:
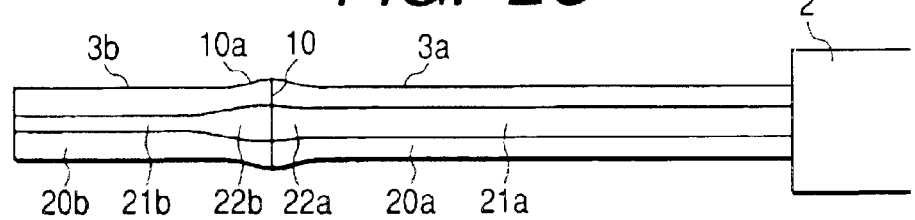

Referring to FIGS. 1 and 2A-2C, the preferred embodiment of the present invention will be described. FIG. 1 shows a basic embodiment of an optical fiber array of the invention. FIGS. 2A to 2C show various forms for splicing optical fibers having different mode field diameters. In these figures, reference numerals 1 denotes an optical fiber, 2 denotes a fiber coating portion, 3 denotes a bare fiber portion, 3a, 3b denote a bare fiber, 4 denotes an optical fiber array, 5 denotes an array substrate, 5a denotes a fiber aligning portion, 5b denotes a base portion, 6 denotes a presser member, 7 denotes a V-groove, 10 denotes a spliced portion, 10a denotes a fat portion, 11 denotes a first adhesive, 12 denotes a second adhesive, 13 denotes a third adhesive, 20a, 20b denote a cladding portion, 21a, 21b denote a core portion, and 22a, 22b denote a mode field converting portion.

Figure 6:
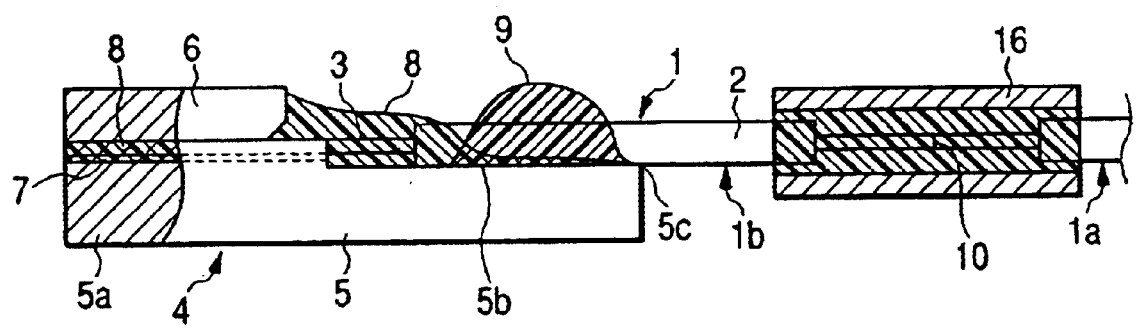
FIG. 6 is a view for explaining the configuration of the related-art optical fiber array.

The shape of the optical fiber array 4 as shown in FIG. 1 is similar to that of FIG. 6. However, the optical fiber array 4 includes the array substrate 5 and the presser member 6. The array substrate 5 includes a fiber aligning portion 5a at a front portion thereof and a base portion 5b with a flat upper face at a rear portion thereof. The fiber aligning portion 5a has the V-groove 7 for positioning the bare fiber portion 3.

The bare fiber portion 3 on the array substrate 5 has the bare fiber 3a in which the fiber coating is removed, and the bare fiber 3b that is of different kind from the bare fiber 3a, as shown in FIGS. 2A-2C. The bare fiber 3b is spliced to a top end of the bare fiber 3a. The bare fiber 3a is a standard single mode optical fiber, for example, and has the cladding portion 20a and the core portion 21a. The mode field diameter of the core portion 21a is as large as about 10 μm. The bare fiber 3b is a non-standard optical fiber with a dopant added in the core portion 21b at high density, for example, and has the cladding portion 20b around the core portion 21b. The mode field diameter of the core portion 21b is as large as about 5 μm.

The spliced portion 10 between the bare fiber 3a and the bare fiber 3b is formed by physically abutting the bare fiber 3a against the bare fiber 3b, or formed by fusing the bare fibers 3a and 3b. To prevent an increase in the splice loss due to a difference in the mode field diameter at the spliced portion, the spliced portion 10 is subjected to the TEC process by additional heating. By this TEC process, dopants in the core portion 21a, 21b of the bare fiber 3a, 3b is thermally diffused to the cladding portion 20a, 20b to form the mode field converting portion 22a, 22b, thereby making both the mode field diameters coincident or approximate.

FIG. 2A shows the case where the bare fiber 3a and the bare fiber 3b are abutted and jointed each other in this case, an intermediate part of the bare fiber 3b is subjected to the TEC process in advance, and then, a central part of the TEC portion is cleaved and/or polished, thereby matching a spliced end of the bare fiber 3b with the mode field diameter of the bare fiber 3a. FIGS. 2B and 2C show the case where the bare fiber 3a and the bare fiber 3b are fusion spliced, and the spliced portion 10 is subjected to the TEC process by additional heating after being fusion spliced. This TEC process is disclosed in Jananese patent No. 2618500. In fusion splicing, there is a case where the outer diameter of the spliced portion 10 has no fat portion of the bare fiber outer diameter, as shown in FIG. 2B. There is also a case where the outer diameter of the spliced portion 10 has the fat portion 10a of the bare fiber outer diameter, as shown in FIG. 2C.

Turning back to FIG. 1, the constitution for bonding the optical fiber 1 to the array substrate 5 will be described below. In FIG. 1, the bare fiber portion 3 of the optical fiber 1 has the bare fiber 3a and the bare fiber 3b, in which the spliced portion has no fat portion, as shown in FIG. 2A or 2B. In this example, the bare fiber portion 3 is mounted on the fiber aligning portion 5a so that the spliced portion 10 is placed within the V-groove 7 of the array substrate 5, and pressed and positioned by the presser member 6. The spliced portion 10 is bonded within the V-groove 7, reinforced and protected by the adhesive. A top end portion of the fiber coating portion 2 is mounted on the base portion 5b of the array substrate 5, and the bare fiber portion between the rear end of the V-groove 7 and the fiber coating portion 2 is suspended on the base portion 5. The spliced portion 10 may not be pressed by the presser member 6 within the V-groove.

The bare fiber portion 3 positioned by the V-groove 7 and the presser member 6 is bonded by the first adhesive 11. The top end portion of the fiber coating portion 2 is bonded on the base portion 5b by the second adhesive 12. The bare fiber portion 3 between the first and second adhesives is bonded by the third adhesive 13. The first adhesive 11 is a relatively hard adhesive resin having a Young's modulus after hardening of 500 Mpa or more and a viscosity before hardening of 10 Pa.s or less. The second adhesive 12 is a relatively hard adhesive resin having a Young's modulus after hardening of 500 Mpa or more, like the first adhesive 11, and a viscosity before hardening of more than 10 Pa.s. Also, the third adhesive 13 is a relatively soft adhesive resin having a Young's modulus of less than 500 Mpa, which is softer than the first adhesive 11.

The first adhesive 11 has a relative small viscosity, whereby the bare fiber portion 3 is likely to be aligned within the V-groove 7, and can be correctly positioned by the presser member 6, which will be connected to PLCs. Because the Young's modulus after hardening is large, the bare fiber portion 3 can be firmly bonded by adhesives. The second adhesive 12 flows away if it has too small viscosity when applied on the top end portion of the fiber coating portion 2, and hence has a greater viscosity than the first adhesive 11 to be securely applied over the fiber coating portion 2. Since the Young's modulus after hardening is as large as the first adhesive 11, the top end portion of the fiber coating portion 2 can be firmly bonded onto the rear end portion of the array substrate 5.

Accordingly, in bonding the bare fiber portion 3 by the first adhesive 11, a stress concentration can be avoided on the adherent part of the fiber coating portion 2 against a tensile load in the longitudinal direction of the optical fiber 1. Also, in bonding the fiber coating portion 2 by the second adhesive 12, the shift of the optical fiber 1 is restricted, and no stress concentration on the adherent part of the bare fiber portion 3 is caused. Therefore, the first adhesive 11 and the second adhesive 12 can provide a sufficient bearing force against the tensile load in the longitudinal direction of the optical fiber 1.

The third adhesive 13 is applied over the bare fiber portion 3 between the first adhesive and the second adhesive to protect and bond this bare fiber portion, but has a Young's modulus that is relatively smaller than those of the first and second adhesives. Accordingly, the thermal shrinkage of the third adhesive 13 is reduced at lower temperatures, causing a smaller distortion in the bare fiber portion 3, and preventing an increase in the transmission loss.

Figure 3A:
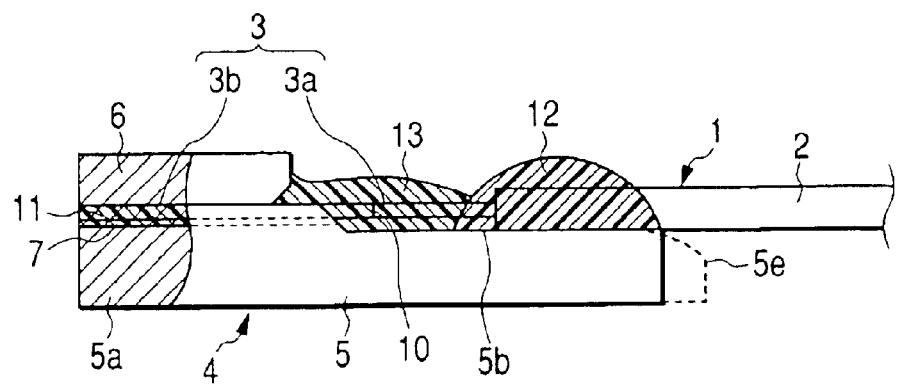
FIGS. 3A-3C are views showing an example in which a spliced portion of the optical fiber by fusion has a fat portion.
Figure 3B:
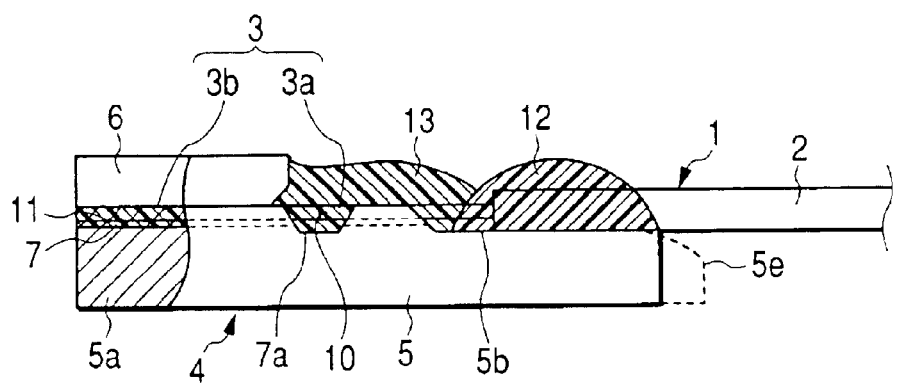
Figure 3C:
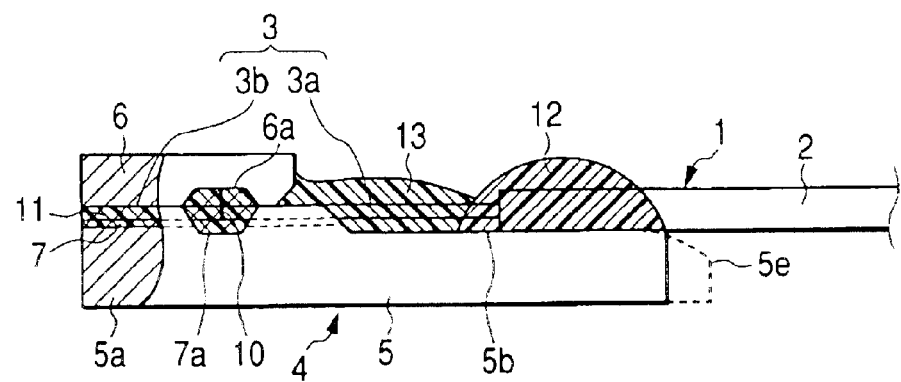

FIGS. 3A to 3C are views showing the examples in which the fat portion 10a as shown in FIG. 2C is present in the spliced portion of the bare fiber 3a and the bare fiber 3b. In FIGS. 3A to 3B, the same or like components are designated by the same numerals as in FIG. 1, and are not described.

In an example of FIG. 3A, the spliced portion 10 is suspended on the base portion 5b outside the V-groove 7, applied with the third adhesive 13, and bonded on the base portion 5b. The bare fiber 3b is only mounted in the V-groove 7, positioned, and bonded by the first adhesive 11. The spliced portion 10 is protected and reinforced by the third adhesive 13 that is softer.

In an example of FIG. 3B, the array substrate 5 has a recess portion 7a which is formed in the intermediate part of the V-groove 7. The spliced portion 10 is disposed in this recess portion 7a. An upper part of the recess portion 7a is not pressed by the presser member 6. Both sides of the spliced portion 10 are supported within the V-groove. The spliced portion 10 is protected and reinforced by the third adhesive 13. In this example, the spliced portion 10 is kept more straight between the V-grooves, and bonded by adhesives in more stable state, in contrast to the example of FIG. 3A.

In an example of FIG. 3C, the array substrate 5 has the recess portion 7a which is formed in the intermediate part of the V-groove 7. The presser member 6 has a recess portion 6a which is formed at a position confronting the recess portion 7a on the presser member 6. Therefore, the spliced portion 10 is disposed in a gap between the recess portions 6a and 7a. The spliced portion 10 is supported within the gap formed by the recess portions 6a and 7a, and protected and reinforced by the first adhesive 11 applied in the V-groove 7. In this example, the spliced portion 10 is positioned by the V-groove 7 and the presser member 6 on both sides, and bonded by the first adhesive 11 to have a greater strength against the tensile load, in contrast to the example of FIGS. 3A and 3B.

As shown in the examples of FIGS. 3A to 3C, a rear edge portion of the array substrate 5 may be formed of a tapered or arc-shaped smooth face 5e (indicated by the dotted line), improving a contact state between the optical fiber 1 and a rear edge of the array substrate 5. Thereby, the optical fiber 1 is less subjected to a damage by the rear edge of the array substrate 5, or is less likely to be bent excessively under the optical fiber array 4, reducing a disconnection or an increase in the transmission loss. Whether suspended from the base portion 5A or not and/or reinforced with adhesive or not, it is preferable not to dispose the splice point in contact with the base portion, as the splice point is weaker in tensile strength in general.

Figure 4:
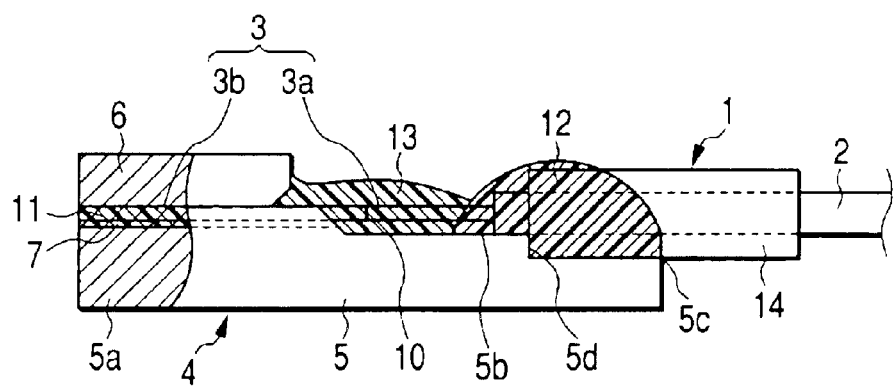
FIG. 4 is a view showing an example in which a tube protection member is employed in the invention.
Figure 5A:
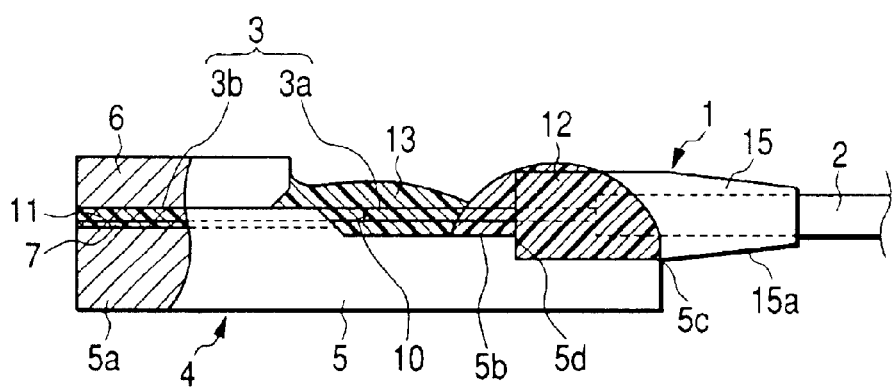
FIGS. 5A and 5B are views showing an example in which a molded protection member is used in the invention.
Figure 5B:
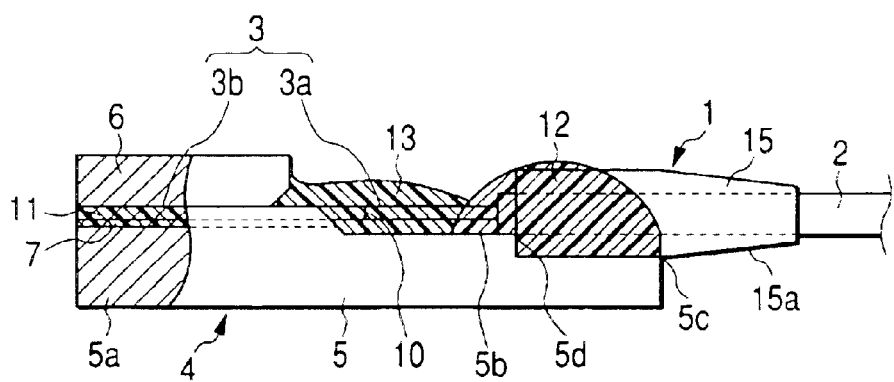

FIGS. 4 and 5A-5B are views showing the examples in which the contact of the optical fiber(s) with the rear edge of the array substrate is improved by the use of a protection member. FIG. 4 shows an example in which the protection member preformed like a tube is employed. FIG. 5A shows an example in which the protection member is formed by molding on the fiber coating portion and the bare fiber portion. FIG. 5B shows an example in which the protection member is formed by molding on the fiber coating portion. In these figures, reference numerals 14 and 15 denote the protection member. Other components are designated by the same reference numerals as used in FIG. 1, and not described.

In FIGS. 4 and 5A-5B, the spliced portion 10 between the bare fiber 3a and the bare fiber 3b is suspended on the base portion 5b rearward of the V-groove 7 as shown in FIG. 3A, coated with the third adhesive 13, and fixed on the base portion 5b by the adhesive 13. However, the constitution or form as shown in FIGS. 1, 3B and 3C is also applied to this embodiment.

In FIG. 4, the tube protection member 14 is provided over the fiber coating portion extending over the rear edge 5c of the array substrate 5, thereby preventing the optical fiber 1 from directly coming into contact with the rear edge 5c of the array substrate 5. The tube protection member 14 is preformed, then the optical fiber 1 is inserted, fixed onto the fiber coating portion 2 by the adhesive, and mounted on the array substrate 5. However, the process may be reversed: after the tube protection member 14 is fixed at the rear end portion of the array substrate 5 by the adhesive, then the optical fiber may be inserted through a tube of the protection member 14.

The tube protection member 14 is formed of a flexible, bendable material such as rubber, silicone or polymer like Nylon. The protection member 14 is attached with a slight distance (e.g., about 0.5 mm to 2.0 mm) from the top end of the fiber coating portion 2, so that the fiber coating portion 2, which is not covered by the protection member 14, may adhere to the array substrate 5. The protection member 14 has a length with a certain amount of extension (e.g., desirably about 3 mm to 5 mm) from the rear end of the array substrate 5. The protection member 14 is positioned for attachment by abutting its top end against a shoulder of a step portion 5d provided on the base portion 5b of the array substrate 5.

The protection member 14 is bonded integrally with the optical fiber 1 by applying the adhesive to fill in a part or the entire gap portion between the protection member 14 and the fiber coating portion 2. This adhesive may or may not be the same as the second adhesive. The protection member 14 may be attached individually on each optical fiber integrally or all optical fibers, or attached on the optical fiber ribbon.

In the constitution of FIG. 4, like the case of FIG. 1, the bare fiber portion 3 positioned by the V-groove 7 is fixed by the first adhesive 11. The top end portion of the fiber coating portion 2 is fixed on the base portion 5b by the second adhesive 12. The bare fiber portion 3 between the first and second adhesives is fixed by the third adhesive 13. The first adhesive 11 is a relatively hard adhesive resin having a Young's modulus after hardening of greater than 500 Mpa and a viscosity before hardening of 10 Pa.s or less. The second adhesive 12 is a relatively hard adhesive resin having a Young's modulus after hardening of greater than 500 Mpa, like the first adhesive 11, and a viscosity before hardening of 10 Pa.s or more that is greater than that of the first adhesive 11. Also, the third adhesive 13 is a relatively soft adhesive resin having a Young's modulus of less than 500 Mpa, which is softer than the first adhesive 11.

The second adhesive 12 for bonding the fiber coating portion 2 on the array substrate 5 is applied to cover a part of the fiber coating portion 2 projecting from the top end of the protection member 14 and a part of the protection member 14 mounted on the array substrate 5. Thereby, the tensile load in the longitudinal direction of the optical fiber 1 is prevented from being directly applied on the bare fiber portion 3 bonded in the V-groove 7, as in the case of FIG. 1.

The protection member 14 is located to extend over the rear edge 5c of the array substrate 5, and serves as a cushion for preventing the optical fiber array 1 from directly coming into contact therewith. Also, the optical fiber 1 is less subjected to a damage by the rear edge of the array substrate 5, or is less likely to be bent excessively under the optical fiber array 4, reducing the possibility of the disconnection or an increase in the transmission loss, without working the rear edge of the array substrate 5 with a smooth face, as shown in FIGS. 3A-3C.

In an example of FIG. 5A, the protection member 15 is formed, using a mold, to cover an end portion of the fiber coating portion 2 for the optical fiber 1 and a part of the bare fiber portion 3. The protection member 15 is provided to extend over the rear edge 5c of the array substrate 5 to prevent the optical fiber 1 from directly coming into contact with the rear edge 5c of the array substrate 5.

In an example of FIG. 5B, the protection member 15 is formed, using a mold, to cover an outer circumference of an end portion of the fiber coating portion 2 for the optical fiber 1 so that the top end of the fiber coating portion projects by a slight amount (e.g., about 0.5 mm to 2 mm) from the protection member 15. The protection member 15 is provided to extend over the rear edge 5c of the array substrate 5 to prevent the optical fiber 1 from directly coming into contact with the rear edge 5c of the array substrate 5.

The protection member 15 is formed of a flexible, bendable material such as rubber, silicon or Nylon. The protection member 15 desirably has an excellent adhesion with the fiber coating portion 2, and a large rupture elongation. The protection member 5 is formed to have a certain amount of extension (e.g., desirably about 3 mm to 5 mm) from the rear end of the array substrate 5. This projecting portion 15a is preferably tapered to prevent the stress against the bending from applying the optical fiber. Also, the protection member 15 is positioned for attachment by abutting its top end against a shoulder of the step portion 5d provided on the base portion 5b of the array substrate 5.

In the constitution of FIGS. 5A and 5B, like the case of FIG. 1, the bare fiber portion 3 positioned by the V-groove 7 is bonded by the first adhesive 11. The top end portion of the fiber coating portion 2 is bonded on the base portion 5b by the second adhesive 12. The bare fiber portion 3 between the first and second adhesives is bonded by the third adhesive 13. The first adhesive 11 is a relatively hard adhesive resin having a Young's modulus after hardening of greater than 500 Mpa and a viscosity before hardening of 10 Pa.s or less. The second adhesive 12 is a relatively hard adhesive resin having a Young's modulus after hardening of greater than 500 Mpa, like the first adhesive 11, and a viscosity before hardening of 10 Pa.s or more that is greater than that of the first adhesive 11. Also, the third adhesive 13 is a relatively soft adhesive resin having a Young's modulus of less than 500 Mpa, which is softer than the first adhesive 11.

The second adhesive 12 for bonding the fiber coating portion 2 on the array substrate 5 is applied to cover the protection member 15 mounted on the array substrate 5 in FIG. 5A. Also, the second adhesive 12 is applied to cover a part of the fiber coating portion 2 exposed and projecting from the top end of the protection member 15 and a part of the protection member 15 mounted on the array substrate 5 in FIG. 5B. Thereby, the tensile load in the longitudinal direction of the optical fiber 1 is prevented from being directly applied on the bare fiber portion 3 bonded in the V-groove 7, as in the case of FIG. 1.

The protection member 15 is located to extend over the rear edge 5c of the array substrate 5, and serves as a cushion for preventing the optical fiber array 1 from directly coming into contact therewith. Also, the optical fiber 1 is less subjected to a damage by the rear edge of the array substrate 5, or is less likely to be bent excessively under the optical fiber array 4, reducing the disconnection or an increase in the transmission loss, without working the rear edge of the array substrate 5 with a smooth face, as shown in FIGS. 3A-3C. However, even when the protection member 14 or 15 is employed, the rear edge of the array substrate 5 may be formed with a smooth face that is tapered or arc-shaped, as in the case of FIGS. 3A-3C. Through FIG. 1 to FIG. 5A, an optical fiber is drawn, however, the present invention is not limited to an optical fiber. Namely, optical fibers may be fixed onto a substrate to form an optical fiber array in this invention.

As will be apparent from the above description, with the present invention, the spliced portion of the dissimilar optical fibers having different mode field diameters can be contained within the optical fiber array. Therefore, the optical fiber is easily led in a small space within the optical communication unit, thereby making it possible to miniaturize the unit. Also, the protection member is provided to prevent the optical fiber from being in contact with the rear edge of the optical fiber array, whereby the disconnection or an increase in the transmission loss can be reduced. Furthermore, the optical fiber is bonded onto the optical fiber array, employing three kinds of adhesives that are different in the Young's modulus after hardening, or the viscosity before hardening, whereby the optical fiber can be strong enough to resist the tensile load, and can prevent an increase in the transmission loss due to a temperature change.

What is claimed is:

1. An optical fiber array comprising:
   an optical fiber formed by splicing dissimilar optical fibers having different mode field diameters, the optical fiber having a fiber coating portion in which a fiber coating is applied and a bare fiber portion in which the fiber coating is removed, the bare fiber portion having a spliced portion of the dissimilar optical fibers in the middle;
   an array substrate for mounting the optical fiber thereon, the array substrate having a fiber aligning portion and a base portion, the fiber aligning portion having a groove for positioning the bare fiber portion of the optical fiber, the base portion where the bare fiber portion extending from the fiber aligning portion and part of the fiber coating portion are disposed;
   a pressure member for pressing the bare fiber portion to the groove of the array substrate; and
   a first adhesive for fixing the bare fiber portion to the groove of the array substrate,
   wherein the spliced portion is disposed on the base portion of the array substrate.

2. The optical fiber array according to claim 1, wherein the dissimilar optical fibers are fusion spliced at the spliced portion.

3. The optical fiber array according to claim 2, wherein the bare fiber portion has a mode field conversion portion formed by heating the spliced portion of the dissimilar optical fibers.

4. An optical fiber array comprising:
   an optical fiber formed by splicing dissimilar optical fibers having different mode field diameters, the optical fiber having a fiber coating portion in which a fiber coating is applied and a bare fiber portion in which the fiber coating is removed, the bare fiber portion having a spliced portion of the dissimilar optical fibers in the middle;
   an array substrate for mounting the optical fiber thereon, the array substrate having a fiber aligning portion and a base portion, the fiber aligning portion having a groove for positioning the bare fiber portion of the optical fiber;
   a pressure member for pressing the bare fiber portion to the groove of the array substrate; and
   a first adhesive for fixing the bare fiber portion to the groove of the array substrate,
   wherein the spliced portion of the dissimilar optical fibers is disposed on the array substrate, and
   the array substrate has a tapered or arc-shaped rear end portion configured to allow the optical fiber extending from the array substrate to bend along a shape of the tapered or arc-shaped rear end portion when the optical fiber bends.

5. The optical fiber array according to claim 4, wherein the spliced portion is disposed in the groove.

6. The optical fiber array according to claim 5, wherein the groove has a recess portion, and wherein the spliced portion is disposed in the recess portion of the groove.

7. The optical fiber array according to claim 4, wherein the dissimilar optical fibers are fusion spliced at the spliced portion.

8. The optical fiber array according to claim 7, wherein the bare fiber portion has a mode field conversion portion formed by heating the spliced portion of the dissimilar optical fibers.

9. An optical fiber array comprising:
   an optical fiber formed by splicing dissimilar optical fibers having different mode field diameters, the optical fiber having a fiber coating portion in which a fiber coating is applied and a bare fiber portion in which the fiber coating is removed, the bare fiber portion having a spliced portion of the dissimilar optical fibers in the middle;
   an array substrate for mounting the optical fiber thereon, the array substrate having a fiber aligning portion and a base portion, the fiber aligning portion having a groove for positioning the bare fiber portion of the optical fiber;
   a pressure member for pressing the bare fiber portion to the groove of the array substrate;
   a first adhesive for fixing the bare fiber portion to the groove of the array substrate; and
   a protection member for protecting the optical fiber extending over a rear edge of the array substrate, the protection member configured to be in contact with the optical fiber extending over the rear edge,
   wherein the spliced portion of the dissimilar optical fibers is disposed on the array substrate.

10. The optical fiber array according to claim 9, wherein the protection member has a tube shape for accommodating the optical fiber therein.

11. The optical fiber array according to claim 9, wherein the protection member is formed by a mold.

12. The optical fiber array according to claim 9, wherein a portion of the protection member extending over the array substrate has a tapered shape.

13. The optical fiber array according to claim 9, wherein the protection member covers the fiber coating portion.

14. The optical fiber array according to claim 9, wherein the array substrate has a step portion for mounting the protection member thereon.

15. The optical fiber array according to claim 9, wherein the dissimilar optical fibers are fusion spliced at the spliced portion.

16. The optical fiber array according to claim 15, wherein the bare fiber portion has a mode field conversion portion formed by heating the spliced portion of the dissimilar optical fibers.

17. The optical fiber a according to claim 9, wherein the spliced portion is disposed in the groove.

18. The optical fiber array according to claim 17, wherein the groove has a recess portion, and wherein the spliced portion is disposed in the recess portion of the groove.

19. An optical fiber array comprising:

an optical fiber formed by splicing dissimilar optical fibers having different mode field diameters, the optical fiber having a fiber coating portion in which a fiber coating is applied and a bare fiber portion in which the fiber coating is removed, the bare fiber portion having a spliced portion of the dissimilar optical fibers in the middle;

an array substrate for mounting the optical fiber thereon, the array substrate having a fiber aligning portion and a base portion, the fiber aligning portion having a groove for positioning the bare fiber portion of the optical fiber;

a pressure member for pressing the bare fiber portion to the groove of the array substrate;

a first adhesive for fixing the bare fiber portion to the groove of the array substrate, a second adhesive for fixing the fiber coating portion of the optical fiber on the base portion of the array substrate; and a third adhesive for covering and fixing the bare fiber portion which is not disposed in the groove, wherein the spliced portion of the dissimilar optical fibers is disposed on the array substrate, the first adhesive has a Young's modulus after hardening of 500 Mpa or more and a viscosity before hardening of 10 Pa.s or less, the second adhesive has a greater viscosity before hardening than the first adhesive, and the third adhesive has a smaller Young's modulus after hardening than the first adhesive.

* * * * *